(12) United States Patent
Nagatake et al.

(10) Patent No.: US 6,642,679 B2
(45) Date of Patent: Nov. 4, 2003

(54) CAR MOTOR DRIVING APPARATUS

(75) Inventors: Kazuo Nagatake, Machida (JP);
Tsuyoshi Shinohara, Yokohama (JP);
Isao Kishimoto, Yokohama (JP);
Masami Hirata, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1 day.

(21) Appl. No.: 09/907,826

(22) Filed: Jul. 19, 2001

(65) Prior Publication Data

US 2002/0014868 A1 Feb. 7, 2002

(30) Foreign Application Priority Data

Jul. 21, 2000 (JP) ........................................ 2000-221182

(51) Int. Cl.⁷ .................................................. B60L 1/00
(52) U.S. Cl. ......................... 318/139; 318/500; 324/299
(58) Field of Search ................................. 318/139, 500; 307/9.1, 10.1; 363/15, 16; 324/234, 265, 268, 271, 282, 299

(56) References Cited

U.S. PATENT DOCUMENTS

| | | | | |
|---|---|---|---|---|
| 4,875,539 A | * | 10/1989 | Abukawa et al. | .......... 180/79.1 |
| 5,387,820 A | | 2/1995 | Imagawa | |
| 5,606,244 A | * | 2/1997 | Migdal | .......................... 322/7 |
| 5,796,175 A | | 8/1998 | Itoh et al. | |
| RE36,037 E | * | 1/1999 | Rimmer | ...................... 307/9.1 |
| 6,002,221 A | | 12/1999 | Ochiai et al. | |
| 6,097,109 A | * | 8/2000 | Fendt et al. | ................... 307/45 |
| 6,320,274 B1 | * | 11/2001 | Goetze et al. | ................ 307/9.1 |
| 6,335,575 B1 | * | 1/2002 | Reutlinger et al. | ......... 307/10.1 |

FOREIGN PATENT DOCUMENTS

JP      2000-312444      11/2000

* cited by examiner

*Primary Examiner*—Bentsu Ro
(74) *Attorney, Agent, or Firm*—Pillsbury Winthrop LLP (57) ABSTRACT

In a car body provided with a battery with a low output voltage of 12 V, a step-up circuit unit is connected between the battery and an electromechanical energy converting section. In a car provided with a battery with a high output voltage of 36 V, the battery is connected directly to the electromechanical energy converting section.

16 Claims, 5 Drawing Sheets

CAR MOTOR DRIVING APPARATUS

CROSS-REFERENCE TO RELATED APPLICATIONS

This application is based upon and claims the benefit of priority from the prior Japanese Patent Application No. 2000-221182, filed Jul. 21, 2000, the entire contents of which are incorporated herein by reference.

BACKGROUND OF THE INVENTION

1. Field of the Invention

This invention relates to a car motor diving apparatus used to drive, for example, an engine starter motor, an electric power steering motor, and a wiper motor.

2. Description of the Related Art

An electromechanical energy converting section is used to drive the engine starter motor, effect electric power steering, drive the wipers, and open and close the windows. The electromechanical energy converting section receives the output voltage from a main storage battery (hereinafter, referred to as the battery) and then drives the above motors.

Under the leadership of European countries, use of a higher-voltage car battery is being planned. Use of a higher-voltage car battery means that the present output voltage of 12 V is raised to an output voltage of, for example, 36 V or 42 V. Use of such a higher battery output voltage enables wires to be laid with a small amount of copper in supplying the same power in, for example, an EPS. From this, use of higher voltages is expected to lead to resource saving and energy saving.

On the other hand, car manufactures need electromechanical energy converting sections, including motors, inverters, and converters, that meet various voltage specifications according to batteries differing in output voltage. That is, a battery with an output voltage of 12 V requires an electromechanical converting section composed of a motor, inverter, or converter according to specifications complying with the 12-volt output.

Furthermore, a battery with an output voltage of 36 V or 42 V needs an electromechanical converting section composed of a motor, inverter, or converter according to specifications complying with the 36-volt or 42-volt output.

A car is provided with a plurality of electric circuit systems and driving systems that operate on different voltages. A step-up circuit is connected to each of the electric circuit systems and driving system.

Specifically, the step-up circuit is for stepping up or down the output voltage of an alternator and supplying the stepped-up or stepped-down voltage to the corresponding electric circuit system or driving system. That is, each of the stepped-up or stepped-down voltages is used as the power supply for the corresponding electric circuit system and driving system.

This mechanism is a power supply apparatus which steps up or down the output voltage of the alternator instead of providing a plurality of batteries differing in output voltage, and drives a plurality of electric circuit systems and driving systems differing in operating voltage.

The alternator generates electricity according to the car speed when the car is running. When the car is running at high speeds, the alternator generates very high voltages, whereas it does not generate much electricity when it is moving at low speeds.

Therefore, the output voltage of the alternator has to be stepped up or down before it is supplied to a plurality of electric circuit systems and driving systems.

When the car using the output voltage of the alternator as a power supply is standing (or idling), the alternator generates a little electricity. Consequently, the alternator cannot be used in an electric circuit system or driving system that requires a large current, for example, a motor.

With this backdrop, there is a time when a battery with an output voltage of 12 V and a battery with an output voltage of 36 V or 42 V are present in a mixed manner in the course of realizing a plan to make a higher-voltage battery.

Accordingly, there have been demands that, even when an electromechanical energy converting unit complies with 36-volt or 42-volt output specifications, it should be compatible with a battery with an output voltage of 12 V without changing the specification of the electromechanical energy converting unit.

BRIEF SUMMARY OF THE INVENTION

The object of the present invention is to provide a car motor driving apparatus capable of using batteries different in output voltage with the movement toward an electromechanical energy converting unit conforming to higher-voltage specifications.

According to a major aspect of the present invention, there is provided a car motor driving apparatus comprising: an electromechanical energy converting section for driving various motors in a car by applying specific voltages to the motors; a main storage battery for supplying a voltage to the electromechanical energy converting section; and a step-up unit connected between the main storage battery and the electromechanical energy converting section in such a manner that it is switched to either the main storage battery or the electromechanical energy converting section according to the output voltage of the main storage battery.

In the car motor driving apparatus, the step-up unit is disconnected when the main storage battery with an output voltage corresponding to the driving voltage of the electromechanical energy converting section is installed, whereas it is connected when the main storage battery with a lower output voltage than the driving voltage of the electromechanical energy converting section is installed.

Furthermore, the car motor driving apparatus further comprising control means for disconnecting the step-up unit from between the main storage battery and the electromechanical energy converting section when the output voltage gets to correspond to the driving voltage of the electromechanical energy converting section as a result of the replacement of the main storage battery and connecting the main storage battery to the electromechanical energy converting section.

According to a major aspect of the present invention, there is provided a car motor driving apparatus comprising: an electromechanical energy converting section for driving various motors in a car by applying specific voltages to the motors; a main storage battery for supplying a voltage to the electromechanical energy converting section; a step-up unit for stepping up the output voltage of the main storage battery to the driving voltage of the electromechanical energy converting section when the output voltage of the main storage battery is lower than the driving voltage of the electromechanical energy converting section; and a selector switch for connecting the main storage battery to the electromechanical energy converting section when the output voltage of the main storage battery corresponds to the driving voltage of the electromechanical energy converting section, whereas connecting the step-up unit between the main storage battery and the electromechanical energy converting section when the output voltage of the main storage battery is lower than the driving voltage of the electromechanical energy converting section.

In the car motor driving apparatus, the main storage battery produces an output voltage of 12 V and an output voltage of 36 V or 42 V.

Furthermore, in the car motor driving apparatus, the step-up unit is modularized and is capable of being installed on and removed from a desired part of the body of the car.

Additionally, in the car motor driving apparatus, the electromechanical energy converting section is composed of an inverter section for performing direct-current-to-direct-current conversion and a control circuit section for controlling at least the inverter section, the inverter section and control circuit section being modularized and capable of being installed on and removed from a desired part of the body of the car.

Moreover, in the car motor driving apparatus, the various motors include an engine starter, an electric power steering motor, a wiper motor, a window motor, and an air conditioner motor in the car.

Furthermore, in the car motor driving apparatus, the step-up unit is capable of being installed and removed from between the main storage battery and the electromechanical energy converting section.

According to a major aspect of the present invention, there is provided a car motor driving apparatus comprising: a plurality of electromechanical energy converting sections for driving at least an engine starter, an electric power steering motor, a wiper motor, a window motor, and an air conditioner motor in a car by applying specific voltages to the motors; a main storage battery for supplying a voltage to the electromechanical energy converting section; a step-up unit for stepping up the output voltage of the main storage battery to the driving voltage of the electromechanical energy converting section when the output voltage of the main storage battery is lower than the driving voltage of the electromechanical energy converting section; and a selector switch for connecting the main storage battery to the electromechanical energy converting section when the output voltage of the main storage battery corresponds to the driving voltage of the electromechanical energy converting section, whereas connecting the step-up unit between the main storage section and the electromechanical energy converting section when the output voltage of the main storage battery is lower than the driving voltage of the electromechanical energy converting section, wherein the electromechanical energy converting section is composed of an inverter section for performing direct-current-to-direct-current conversion and a control circuit section for controlling at least the inverter section, the inverter section and control circuit section being modularized and capable of being installed on and removed from a desired part of the body of the car.

According to a major aspect of the present invention, there is provided a car motor driving apparatus comprising: a plurality of electromechanical energy converting sections for driving at least an engine starter, an electric power steering motor, a wiper motor, a window motor, and an air conditioner motor in a car by applying specific voltages to the motors; a main storage battery for supplying a voltage to the electromechanical energy converting section; and a step-up unit which is provided between the main storage battery and the electromechanical energy converting section and steps up the output voltage of the main storage battery to the driving voltage of the electromechanical energy converting section when the output voltage of the main storage battery is lower than the driving voltage of the electromechanical energy converting section, and which is removed from between the main storage battery and the electromechanical energy converting section when the output voltage of the main storage battery is higher than the driving voltage of the electromechanical energy converting section, wherein the electromechanical energy converting section is composed of an inverter section for performing direct-current-to-direct-current conversion and a control circuit section for controlling at least the inverter section, the inverter section and control circuit section being modularized and capable of being installed on and removed from a desired part of the body of the car, and the step-up unit is capable of being installed and removed from between the main storage battery and the electromechanical energy converting section.

According to the present invention, it is possible to provide a car motor driving apparatus capable of coping with a battery of any potential.

Furthermore, in the present invention, the main storage battery is connected directly to the electromechanical energy converting section in a car carrying the electromechanical energy converting section with a high driving voltage of 36 V or 42 V, whereas a step-up unit is connected between the main storage battery and the electromechanical energy converging section in a car carrying the electromechanical energy converting section with a low driving voltage of 12 V. This way of connection enables main storage batteries complying with those voltage specifications to be used even during the time when a main storage battery with an output voltage of 12 V and a main storage battery with an output voltage of 36 V or 42 V are present in a mixed manner.

Moreover, in the present invention, since the step-up unit is capable of being installed and removed from between the main storage battery and the electromechanical energy converting section, the replacement of the main storage battery with an output voltage of 12 V with a main storage battery with an output voltage of 36 V can be dealt with by just removing the step-up unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

Hereinafter, referring to the accompanying drawings, a first embodiment of the present invention will be explained.

Figure 1:
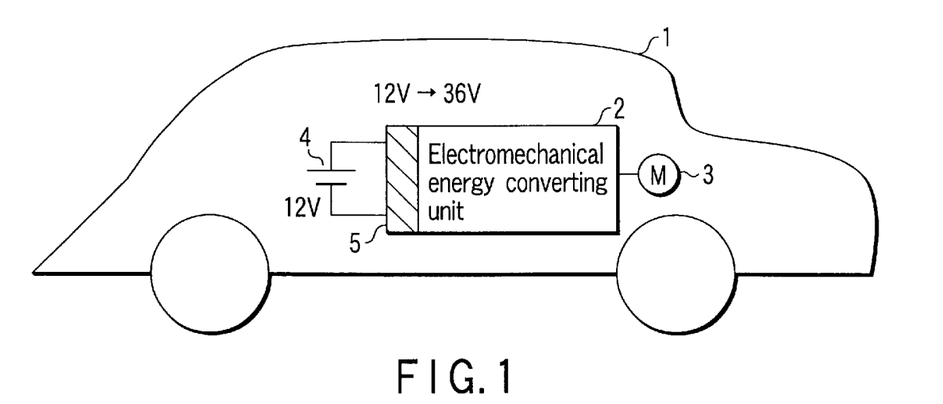
FIG. 1 shows a configuration of a car motor driving apparatus provided with a battery having an output voltage of 12 V according to a first embodiment of the present invention.

FIG. 1 shows a configuration of a car motor driving apparatus provided with a battery having an output voltage of 12 V.

Figure 2:
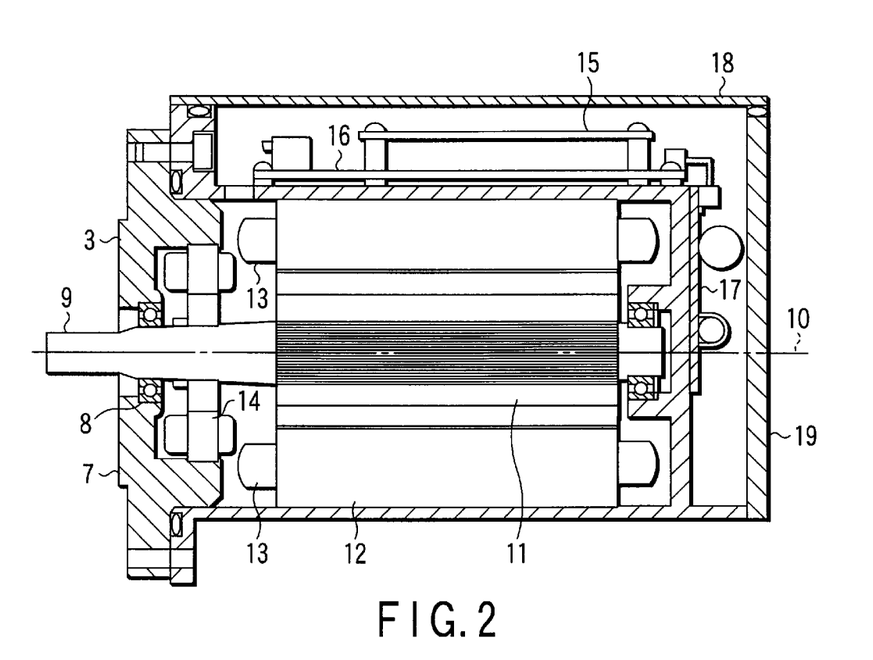
FIG. 2 shows a configuration of the surrounding parts of the brushless DC motor in the car motor driving apparatus of the first embodiment.

A car body 1 is provided with an electromechanical energy converting unit 2 which operates, receiving electric power at 36 V. The electromechanical energy converting unit 2 is for driving a brushless DC motor 3 acting as, for example, an engine starter motor. FIG. 2 shows a configuration of the surrounding parts of the brushless DC motor 3, which will be explained later.

The electromechanical energy converting unit 2 includes a control circuit for controlling the speed and torque of the brushless DC motor 3 and an inverter circuit for driving the brushless DC motor 3.

The electromechanical energy converting unit 2 can be applied to not only the driving of the brushless DC motor 3 but also the driving of, for example, an electric power steering motor, a wiper driving motor, or a window opening/closing motor.

A battery 4 with an output voltage of 12 V is provided on the car body 1.

In the car body 1, a step-up circuit unit 5 is connected between the battery 4 with an output voltage of 12 V and the electromechanical energy converting unit 2.

The step-up circuit unit 5 steps up the 12-volt output of the battery 4 to convert it into an output voltage of 36 V and supplies the 36-volt output to the electromechanical energy converting unit 4.

Figure 3:
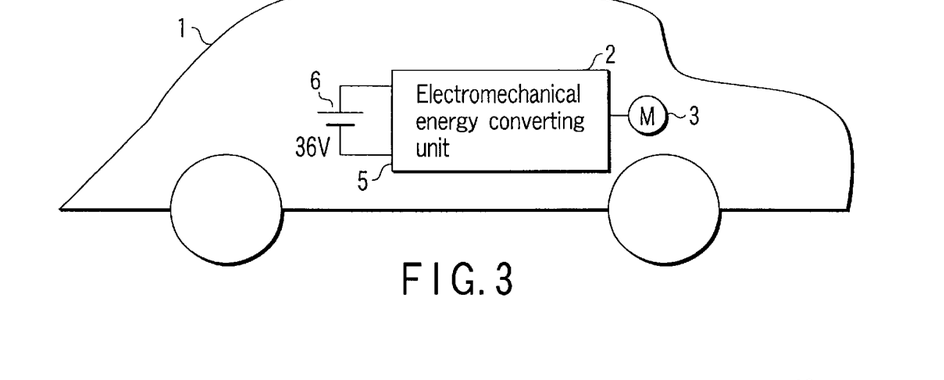
FIG. 3 shows a configuration of a car motor driving apparatus provided with a battery having an output voltage of 36 V according to the first embodiment.

On the other hand, FIG. 3 shows a configuration of a car motor driving apparatus provided with a battery having an output voltage of 36 V. In FIG. 3, the same parts as those in FIG. 1 are indicated by the same reference numerals and a detailed explanation of them will be omitted.

A car body 1 is provided with an electromechanical energy converting unit 2 which operates, receiving electric power at 36 V and operates. The electromechanical energy converting unit 2 is for driving a brushless DC motor 3 acting as, for example, an engine starter motor as shown in FIG. 2.

The electromechanical energy converting unit 2 is composed of a control circuit for controlling the speed and torque of the brushless DC motor 3 and an inverter circuit for driving the brushless DC motor 3.

A battery 6 with an output voltage of 36 V is provided on the car body 1.

The output terminal of the battery 6 is connected directly to the input terminal of the electromechanical energy converting unit 2. The 36-volt output of the battery 6 is supplied directly to the electromechanical energy converting unit 2.

FIG. 2 shows a configuration of the surrounding parts of the brushless DC motor 3.

In the brushless DC motor 3, bearings 8 are provided in a housing 7. The bearings 8 support a rotation axis 9 in such a manner that the axis 9 can rotate freely. The rotation axis 9 is provided along the center 10 of the rotation axis.

The rotation axis 9 is provided with a rotor yoke 11. A stator yoke 12 is provided on the outer periphery of the rotor yoke 11. A coil 13 is provided on the stator yoke 12.

On the outer periphery of the rotation axis 9, there is provided a rotational position sensing element 14. The rotational position sensing element 14 has the function of sensing the rotational position of the rotation axis 9. For example, a resolver is used as the rotational position sensing element 14.

Around the brushless DC motor 3, there are provided a control board 15 carrying a control circuit, a power board 16 carrying an inverter circuit, and a step-up board 17 carrying a step-up circuit unit 5.

The control board 15, power board 16, and step-up board 17 are provided in a space formed when the brushless DC motor 3 is provided on the car body 1. In the brushless DC motor 3, the control board 15 and power board 16 are provided on the side face of the housing 7. The control board 15 and power board 16 are provided along the axis of the brushless DC motor 3. The control board 15 and power board 16 are laid one on top of the other and then provided on the brushless DC motor 3. Specifically, the control board 15 is provided above the power board 16.

At the back of the housing 7, the step-up board 17 is provided. The step-up board 17 is provided in the direction perpendicular to the center 10 of the rotation axis of the brushless DC motor 3.

The control board 15 and power board 16 are concealed in the housing 7 with a side cover 18. The step-up board 17 is concealed in the housing 7 with a rear cover 19.

The control circuit provided on the control board 15 and the inverter circuit provided on the power board 16 constitute the electromechanical energy converting unit 2 as described above. Specifically, the control circuit has the function of controlling the speed and torque of the brushless DC motor 3 and the inverter circuit has the function of driving the brushless DC motor 3.

The step-up board 17 is provided with the step-up circuit unit 5 connected between the battery 4 with an output voltage of 12 V and the electromechanical energy converting unit 2.

Each of the control board 15, power board 16, and step-up board 17 is modularized. The control board 15, power board 16, and step-up board 17 are provided around the brushless DC motor 3 in such a manner that they can be installed and removed.

Although the control board 15, power board 16, and step-up board 17 are provided around the brushless DC motor 3, they may be provided in a given space within the car body, taking into account space saving in the car body 1.

Figure 4:
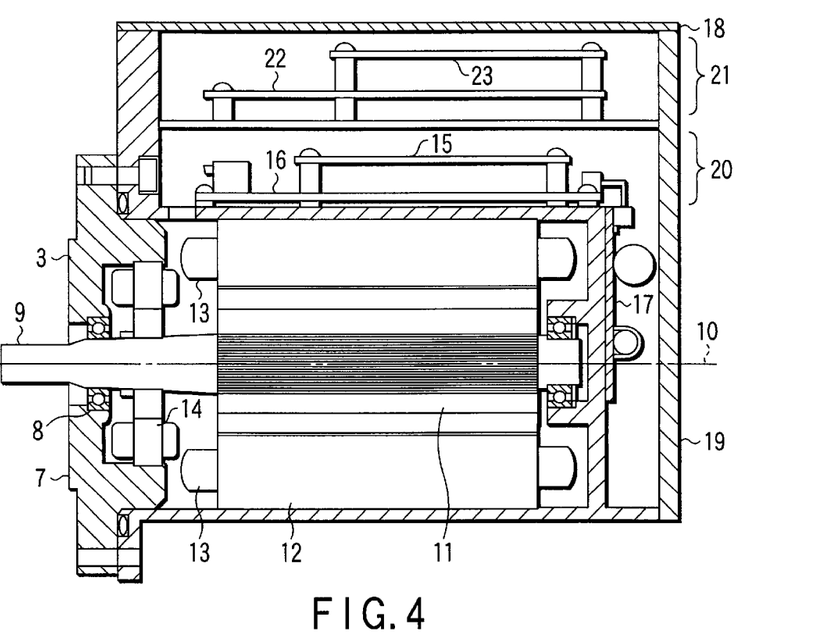
FIG. 4 shows another configuration of the surrounding parts of the brushless DC motor in the car motor driving apparatus of the first embodiment.

FIG. 4 shows another configuration of the surrounding parts of the brushless DC motor 3. In FIG. 4, the same parts as those in FIG. 2 are indicated by the same reference numerals and a detailed explanation of them will be omitted.

In the brushless DC motor 3, a plurality of board mounting sections 20, 21 are formed on the side face of the housing 7. The board mounting section 20, 21 are provided in a space formed according to the relationship between the surrounding parts of the brushless DC motor 3 and the car body 1.

The control board 15 and power board 16 are provided on the substrate mounting section 20. The circuit boards 22 and 23 of, for example, the transmission system in the car are provided on the board mounting section 21.

Another configuration of the surrounding parts of the brushless DC motor 3 is such that a plurality of boards are stacked one on top of another along the center 10 of the rotation axis of the brushless DC motor 3. Of course, this configuration is used when a space is formed along the center 10 of the rotation axis of the brushless DC motor 3 according to the relationship between the surrounding parts of the brushless DC motor 3 and the car body 1.

The step-up board 17 is provided in the car body 1 carrying the battery 4 with an output voltage of 12 V shown in FIG. 1.

In the car body 1 carrying the battery 6 with an output voltage of 36 V shown in FIG. 3, the step-up board 17 is removed.

The step-up board 17 is installed or removed, depending on whether the battery 4 with an output voltage of 12 V or the battery 6 with an output voltage of 36 V is used. It may be connected or disconnected with a selector switch.

Figure 5:
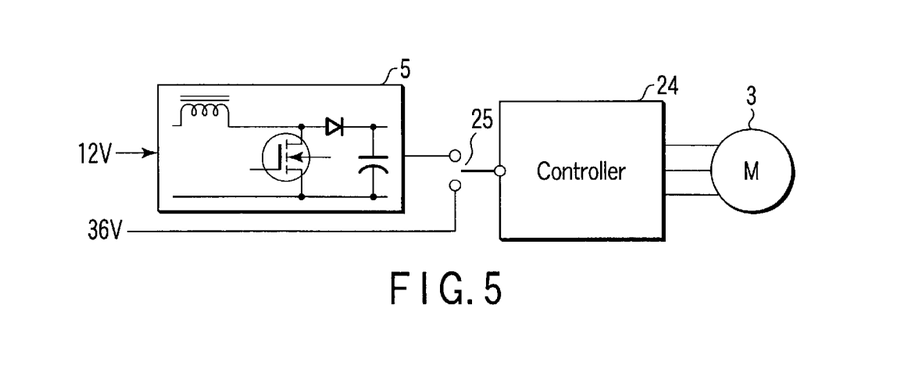
FIG. 5 shows a configuration of the electric circuit of the car motor driving apparatus according to the first embodiment.

FIG. 5 is a configuration of the electric circuit.

The step-up circuit unit 5 is connected to the output terminal of the battery 4 with an output voltage of 12 V. For example, a DC/DC converter is used as the step-up circuit unit 5. The DC/DC converter uses a known circuit configuration.

A selector switch 25 is connected between the output terminal of the step-up circuit unit 5 and a controller 24. The controller 24 includes the control circuit for controlling the speed and torque of the brushless DC motor 3 and the inverter circuit for driving the brushless DC motor 3.

The selector switch 25 switches to the step-up circuit unit 5 side when the battery 4 with an output voltage of 12 V is provided, whereas it switches directly to the battery 6 side when the battery 6 with an output voltage of 36 V is provided.

With this configuration of the electric circuit, both of the batteries 4 and 6 can be used during the time when the battery 4 with an output voltage of 12 V and the battery 6 with an output voltage of 36 V are present in a mixed manner.

Figure 6:
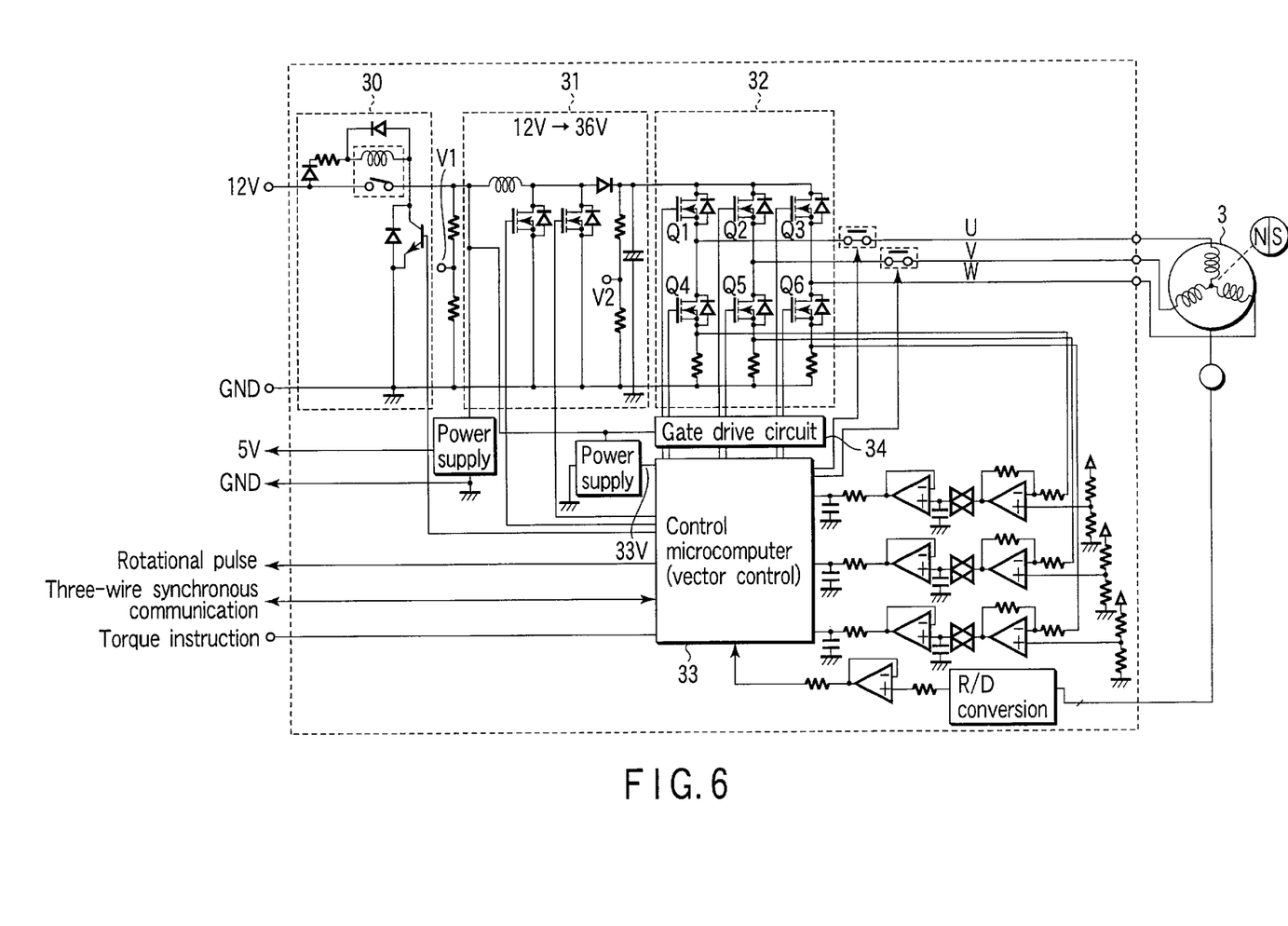
FIG. 6 shows an actual configuration of the car motor driving apparatus according to the first embodiment.

FIG. 6 shows a configuration of an actual car motor driving apparatus.

The battery 4 with an output voltage of 12 V is connected to a reverse connection protective section 30. The reverse connection protective section 30 is for preventing current from flowing reversely when the polarity of the battery 4 is connected in reverse. The reverse connection protective section 30 uses a known circuit configuration. The reverse connection protective section 30 is modularized and provided on the housing of the brushless DC motor 3 in such a manner that it can be installed and removed.

A step-up circuit unit 31 is connected to the output terminal of the reverse connection protective section 30. The step-up circuit unit 31 is for stepping up the 12-volt output of the battery 4 to 36-volt output. The step-up circuit unit 31 uses a known circuit configuration. The step-up circuit unit 31 is modularized and can be installed on and removed from the housing of the brushless DC motor 3.

An inverter section 32 is connected to the output terminal of the step-up circuit unit 31. The inverter section 32 has the function of driving the brushless DC motor 3. The inverter section 32 uses a known circuit configuration. The inverter section 32 is modularized and can be installed on and removed from the housing of the brushless DC motor 3.

The reverse connection protective section 30, step-up circuit unit 31, and inverter section 32 are controlled by a control microcomputer 33. The inverter section 32 is controlled via a gate drive circuit 34 by the control microcomputer 33. The peripheral circuitry of the control microcomputer 33 and gate drive circuit 34 uses a known circuit configuration.

The actual circuit configuration of FIG. 6 is compared with the surrounding parts of the brushless DC motor 3 of FIG. 2. The step-up circuit unit 31 is mounted on the step-up board 17. The inverter section 32 is mounted on the power board 16. The control microcomputer 33 and gate drive circuit 34 are mounted on the control board 15.

The control microcomputer 33 and gate drive circuit 34 mounted on the control board 15 and the inverter section 32 mounted on the power board 16 constitute the electromechanical energy converting unit 2.

With this configuration, the step-up circuit unit 31 is installed on or removed from the housing of the brushless DC motor 3, depending on whether the battery 4 with an output voltage of 12 V or the battery 6 with an output voltage of 36 V is mounted on the car body 1.

Specifically, in the car body 1 provided with the battery 4 with a low voltage of 12 V, the step-up circuit unit 31 is connected between the battery 4 and the electromechanical energy converting section 2. In the car body 1 provided with the battery 6 with a high voltage of 36 V, the battery 6 is connected directly to the electromechanical energy converting section 2.

This enables the electromechanical energy converting section 2 to be standardized according to the 36-volt output specifications.

Therefore, in the car provided with the electromechanical energy converting section 2 conforming to the high-voltage (36 V) specifications, just connecting the battery 6 with an output voltage of 36 V enables the circuit configuration to remain unchanged.

In the car provided with a low-voltage (12 V) battery 2, even when the car is equipped with the electromechanical energy converting section 2 conforming to the high-voltage (36 V) specifications, just installing the step-up circuit unit 5 makes it possible to drive the electromechanical energy converting section 2 complying with the high-voltage (36 V) specifications.

This approach thus has the advantage that car manufacturers need not have a plurality of electromechanical energy converting section 2 according to the individual voltage specifications (12V and 36 V) Therefore, even when the battery 4 with an output voltage of 12 V and the battery 6 with an output voltage of 36 V are present in a mixed manner in the course of realizing a higher-voltage battery, it is not necessary to prepare electromechanical energy converting sections 2 different in voltage specification according to the batteries 4 and 6 differing in output voltage.

The standardization to the electromechanical energy converting section 2 according to the high-voltage (36 V) specifications makes it possible to reduce the loss in the wires, alleviate the effect of the contact resistance of the connector section, and decrease the cross-sectional area of the motor armature winding. This improves the efficiency of assembly.

Furthermore, the inverter voltage of the inverter section 32 can be set arbitrarily, regardless of the battery voltage (12 V or 36 V). Use of 36-volt driving enables motors to be shared in a compact, lightweight manner.

Additionally, the circuitry section (step-up board 17) of the step-up circuit unit 5, the control microcomputer 34 constituting the electromechanical energy converting section 2, and the inverter section 32 are each modularized and can be installed and removed.

The modularization enables them to be installed freely in a given space within the car body 1, taking into account space saving in the car body 1. The standardization of the step-up part particularly enables the step-up circuit unit 5 to be removed freely. When the battery voltage becomes 36 V, the step-up circuit unit 31 need not be used.

Therefore, the potential of the battery is raised from, for example, 12 V to 36 V, enabling wires to be laid with a small amount of copper (the weight of copper) in supplying the same power in, for example, an EPS, which is expected to lead to resource saving and energy saving.

Hereinafter, a second embodiment of the present invention will be explained.

In making the battery voltage higher, the present output voltage is not limited to being raised from 12 V to 36 V. It may be raised from 12 V to 42 V.

Figure 7:
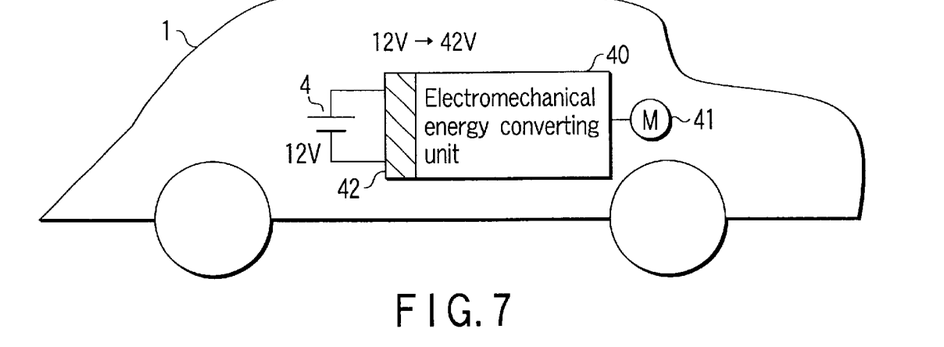
FIG. 7 shows a configuration of a car motor driving apparatus provided with a battery having an output voltage of 12 V according to a second embodiment of the present invention.

FIG. 7 shows a configuration of a car motor driving apparatus provided with a battery having an output voltage of 12 V. In FIG. 7, the same parts as those of FIG. 1 are indicated by the same reference numerals and a detailed explanation of them will be omitted.

A car body 1 is provided with an electromechanical energy converting unit 40 which operates, receiving electric power at 42 V. The electromechanical energy converting unit 40 is for driving a brushless DC motor 41 acting as, for example, an engine starter motor.

The electromechanical energy converting unit 40 includes a control circuit for controlling the speed and torque of the brushless DC motor 41 and an inverter circuit for driving the brushless DC motor 41.

The electromechanical energy converting unit 40 can be applied to not only the driving of the brushless DC motor 41 but also the driving of, for example, an electric power steering motor, a wiper driving motor, or a window opening/closing motor.

A battery 4 with an output voltage of 12 V is provided on the car body 1.

In the car body 1, a step-up circuit unit 42 is connected between the battery 4 with an output voltage of 12 V and the electromechanical energy converting unit 40.

The step-up circuit unit 42 steps up the 12-volt output of the battery 4 to convert it into an output voltage of 42 V and supplies the 42-volt output to the electromechanical energy converting unit 40.

Figure 8:
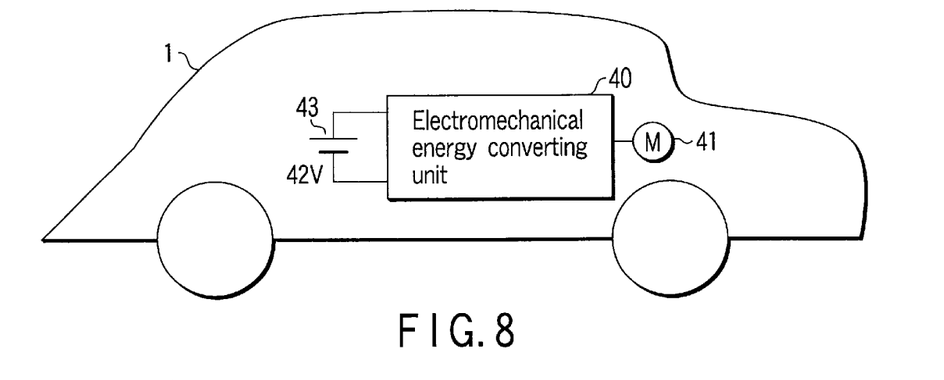
FIG. 8 shows a configuration of a car motor driving apparatus provided with a battery having an output voltage of 42 V according to the second embodiment.

On the other hand, FIG. 8 shows a configuration of a car motor driving apparatus provided with a battery having an output voltage of 42 V. In FIG. 8, the same parts as those in FIG. 7 are indicated by the same reference numerals and a detailed explanation of them will be omitted.

A battery 43 with an output voltage of 42 V is provided on the car body 1.

The output terminal of the battery 43 is connected directly to the input terminal of the electromechanical energy converting unit 40. The 42-volt output of the battery 43 is supplied directly to the electromechanical energy converting unit 40.

Figure 9:
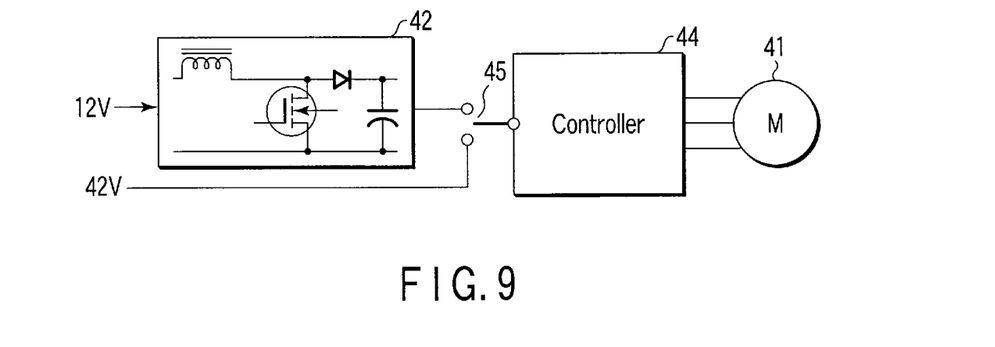
FIG. 9 shows a configuration of the electric circuit of the car motor driving apparatus according to the second embodiment.

FIG. 9 shows a configuration of the electric circuit.

The step-up circuit unit 42 is connected to the output terminal of the battery 4 with an output voltage of 12 V. For example, a DC/DC converter is used as the step-up circuit unit 42. The DC/DC converter uses a known circuit configuration.

A selector switch 45 is connected between the output terminal of the step-up circuit unit 42 and a controller 44. The controller 44 includes the control circuit for controlling the speed and torque of the brushless DC motor 41 and the inverter circuit for driving the brushless DC motor 41.

The selector switch 45 switches to the step-up circuit unit 42 side when the battery 4 with an output voltage of 12 V is provided, whereas it switches directly to the battery 43 side when the battery 43 with an output voltage of 42 V is provided.

Figure 10:
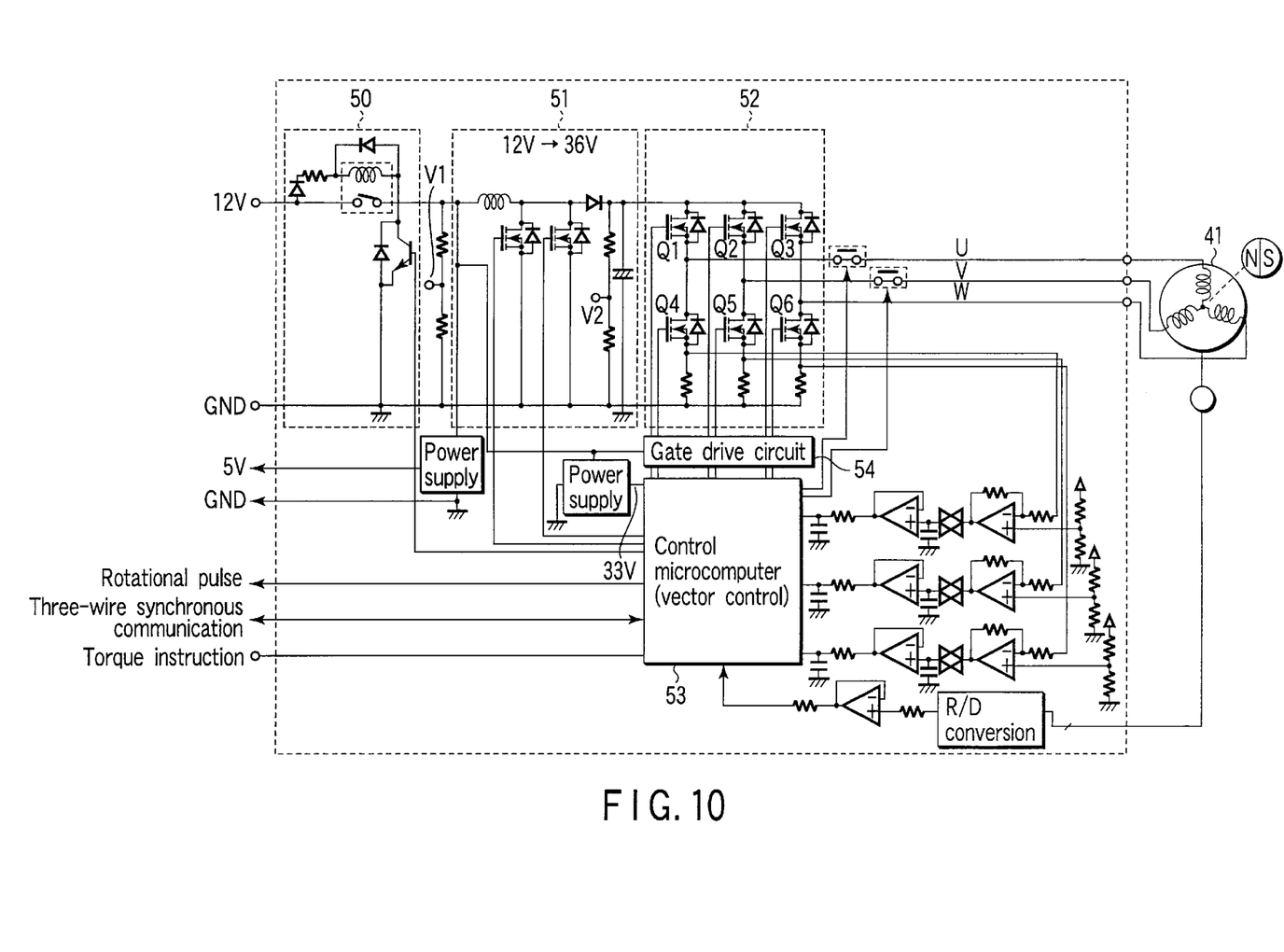
FIG. 10 shows an actual configuration of the car motor driving apparatus according to the second embodiment.

FIG. 10 shows a configuration of an actual car motor driving apparatus.

The battery 4 with an output voltage of 12 V is connected to a reverse connection protective section 50. The reverse connection protective section 50 is for preventing current from flowing reversely when the polarity of the battery 4 is connected in reverse. The reverse connection protective section 50 uses a known circuit configuration. The reverse connection protective section 50 is modularized and provided on the housing of the brushless DC motor 41 in such a manner that it can be installed and removed.

A step-up circuit unit 51 is connected to the output terminal of the reverse connection protective section 50. The step-up circuit unit 51 is for stepping up the 12-volt output of the battery 4 to 42 V. The step-up circuit unit 51 uses a known circuit configuration. The step-up circuit unit 51 is modularized and can be installed on and removed from the housing of the brushless DC motor 41.

An inverter section 52 is connected to the output terminal of the step-up circuit unit 51. The inverter circuit 52 has the function of driving the brushless DC motor 41. The inverter section 52 uses a known circuit configuration. The inverter section 52 is modularized and can be installed on and removed from the housing of the brushless DC motor 41.

The reverse connection protective section 50, step-up circuit unit 51, and inverter section 52 are controlled by a control microcomputer 53. The inverter section 52 is controlled via a gate drive circuit 54 by the control microcomputer 53. The peripheral circuitry of the control microcomputer 53 and gate drive circuit 54 uses a known circuit configuration.

The surrounding parts of the brushless DC motor 41 have the same configuration as that of FIG. 2, except that the step-up circuit unit 51 is mounted on the step-up board 17. The inverter section 52 is mounted on the power board 16. The control microcomputer 53 and gate drive circuit 54 are mounted on the control board 15.

With this configuration, the step-up circuit unit 51 is installed on or removed from the housing of the brushless DC motor 41, depending on whether the battery 4 with an output voltage of 12 V or the battery 43 with an output voltage of 42 V is mounted on the car body 1.

Specifically, in the car body 1 provided with the battery 4 with a low voltage of 12 V, the step-up circuit unit 41 is connected between the battery 4 and the electromechanical energy converting unit 40. In the car body 1 provided with the battery 43 with a high voltage of 42 V, the battery 43 is connected directly to the electromechanical energy converting unit 40.

Therefore, the second embodiment produces the same effect as that of the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A car motor driving apparatus comprising:
    an electromechanical energy converting section having an inverter section for converting direct current into alternating current and a control circuit for controlling at least the inverter section, said electromechanical energy converting section driving a car-mounted motor by applying a specific voltage output from the inverter section;
    a main storage battery for supplying power at a battery voltage to the electromechanical energy converting section;
    a step-up unit connectably or disconnectably arranged between said main storage battery and said electromechanical energy converting section in accordance with the battery voltage from the main storage battery:
    a power board on which the inverter section is mounted:
    a control board on which the control circuit is mounted: and
    a step-up board on which the step-up unit is mounted: wherein
    a control signal is output from the control circuit to the step-up unit, the battery voltage from the main storage battery is stepped up by the step-up unit, and it is supplied to the electromechanical energy converting section when the step-up unit is mounted on a car body, and
    a control signal is output from the control circuit to the inverter section and the battery voltage from the main storage battery is supplied to the electromechanical energy converting section without being stepped-up when the step-up unit is not mounted on a car body.

2. The car motor driving apparatus according to claim 1, wherein said step-up unit is disconnected when said main storage battery with an output voltage corresponding to the driving voltage of said electromechanical energy converting section is installed, whereas it is connected when said main storage battery with a lower output voltage than the driving voltage of said electromechanical energy converting section is installed.

3. The car motor driving apparatus according to claim 1, wherein said main storage battery produces an output voltage of 12 V and an output voltage of 36 V or 42 V.

4. The car motor driving apparatus according to claim 1, wherein said step-up unit is modularized and is capable of being installed on and removed from a desired part of the body of said car.

5. The car motor driving apparatus according to claim 1, wherein said electromechanical energy converting section is composed of an inverter section for performing direct-current-to-direct-current conversion and a control circuit section for controlling at least said inverter section, the inverter section and control circuit section being modularized and capable of being installed on and removed from a desired part of the body of said car.

6. The car motor driving apparatus according to claim 1, wherein said motor includes an engine starter, an electric power steering motor, a wiper motor, a window motor, and an air conditioner motor in said car.

7. The car motor driving apparatus according to claim 1, wherein said step-up unit is capable of being installed and removed from between said main storage battery and said electromechanical energy converting section.

8. The car motor driving apparatus comprising:
    an electromechanical energy converting section for driving a car-mounted motor by applying a specific voltage thereto;
    a main storage battery for supplying power at a battery voltage to the electromechanical energy converting section;
    a step-up unit connectably or disconnectably arranged between the main storage battery and the electromechanical energy converting section; and
    control means for disconnecting said step-up unit from between said main storage battery and said electromechanical energy converting section when the output voltage gets to correspond to the driving voltage of said electromechanical energy converting section as a result of the replacement of said main storage battery and connecting said main storage battery to said electromechanical energy converting section, wherein
    the battery voltage from the main storage battery is stepped-up and supplied to the electromechanical energy converting section when the step-up unit is connected between the electromechanical energy converting section and the main storage battery, and
    the battery voltage from the main storage battery is supplied to the electromechanical energy converting section when the step-up unit is disconnected between the electromechanical energy converting section and the main storage battery.

9. A car motor driving apparatus comprising:
    an electromechanical energy converting section for driving various motors in a car by applying specific voltages to the motors;
    a main storage battery for supplying a voltage to the electromechanical energy converting section;
    a step-up unit for stepping up the output voltage of the main storage battery to the driving voltage of said electromechanical energy converting section when the output voltage of the main storage battery is lower than the driving voltage of said electromechanical energy converting section; and
    a selector switch for connecting said main storage battery to said electromechanical energy converting section when the output voltage of said main storage battery corresponds to the driving voltage of said electromechanical energy converting section, whereas connecting said step-up unit between said main storage battery and said electromechanical energy converting section when the output voltage of said main storage battery is lower than the driving voltage of said electromechanical energy converting section.

10. The car motor driving apparatus according to claim 9, wherein said main storage battery produces an output voltage of 12 V and an output voltage of 36 V or 42 V.

11. The car motor driving apparatus according to claim 9, wherein said step-up unit is modularized and is capable of being installed on and removed from a desired part of the body of said car.

12. The car motor driving apparatus according to claim 9, wherein said electromechanical energy converting section is composed of an inverter section for performing direct-current-to-direct-current conversion and a control circuit section for controlling at least said inverter section, the inverter section and control circuit section being modularized and capable of being installed on and removed from a desired part of the body of said car.

13. The car motor driving apparatus according to claim 9, wherein said motor includes an engine starter, an electric power steering motor, a wiper motor, a window motor, and an air conditioner motor in said car.

14. The car motor driving apparatus according to claim 9, wherein said step-up unit is capable of being installed and removed from between said main storage battery and said electromechanical energy converting section.

15. A car motor driving apparatus comprising:
- a plurality of electromechanical energy converting sections for driving at least an engine starter, an electric power steering motor, a wiper motor, a window motor, and an air conditioner motor in a car by applying specific voltages to the motors;
- a main storage battery for supplying a voltage to the electromechanical energy converting section;
- a step-up unit for stepping up the output voltage of the main storage battery to the driving voltage of said electromechanical energy converting section when the output voltage of the main storage battery is lower than the driving voltage of said electromechanical energy converting section; and
- a selector switch for connecting said main storage battery to said electromechanical energy converting section when the output voltage of said main storage battery corresponds to the driving voltage of said electromechanical energy converting section, whereas connecting said step-up unit between said main storage section and said electromechanical energy converting section when the output voltage of said main storage battery is lower than the driving voltage of said electromechanical energy converting section, wherein said electromechanical energy converting section is composed of an inverter section for performing direct-current-to-direct-current conversion and a control circuit section for controlling at least said inverter section, the inverter section and control circuit section being modularized and capable of being installed on and removed from a desired part of the body of said car.

16. A car motor driving apparatus comprising:
- a plurality of electromechanical energy converting sections for driving at least an engine starter, an electric power steering motor, a wiper motor, a window motor, and an air conditioner motor in a car by applying specific voltages to the motors;
- a main storage battery for supplying a voltage to the electromechanical energy converting section; and
- a step-up unit which is provided between said main storage battery and said electromechanical energy converting section and steps up the output voltage of said main storage battery to the driving voltage of said electromechanical energy converting section when the output voltage of said main storage battery is lower than the driving voltage of said electromechanical energy converting section, and which is removed from between said main storage battery and said electromechanical energy converting section when the output voltage of said main storage battery is higher than the driving voltage of said electromechanical energy converting section, wherein said electromechanical energy converting section is composed of an inverter section for performing direct-current-to-direct-current conversion and a control circuit section for controlling at least said inverter section, the inverter section and control circuit section being modularized and capable of being installed on and removed from a desired part of the body of said car, and said step-up unit is capable of being installed and removed from between said main storage battery and said electromechanical energy converting section.

* * * * *